No. 727,886. PATENTED MAY 12, 1903.
C. J. BOLTE.
DRAFT ATTACHMENT FOR VEHICLES.
APPLICATION FILED FEB. 9, 1903.
NO MODEL.
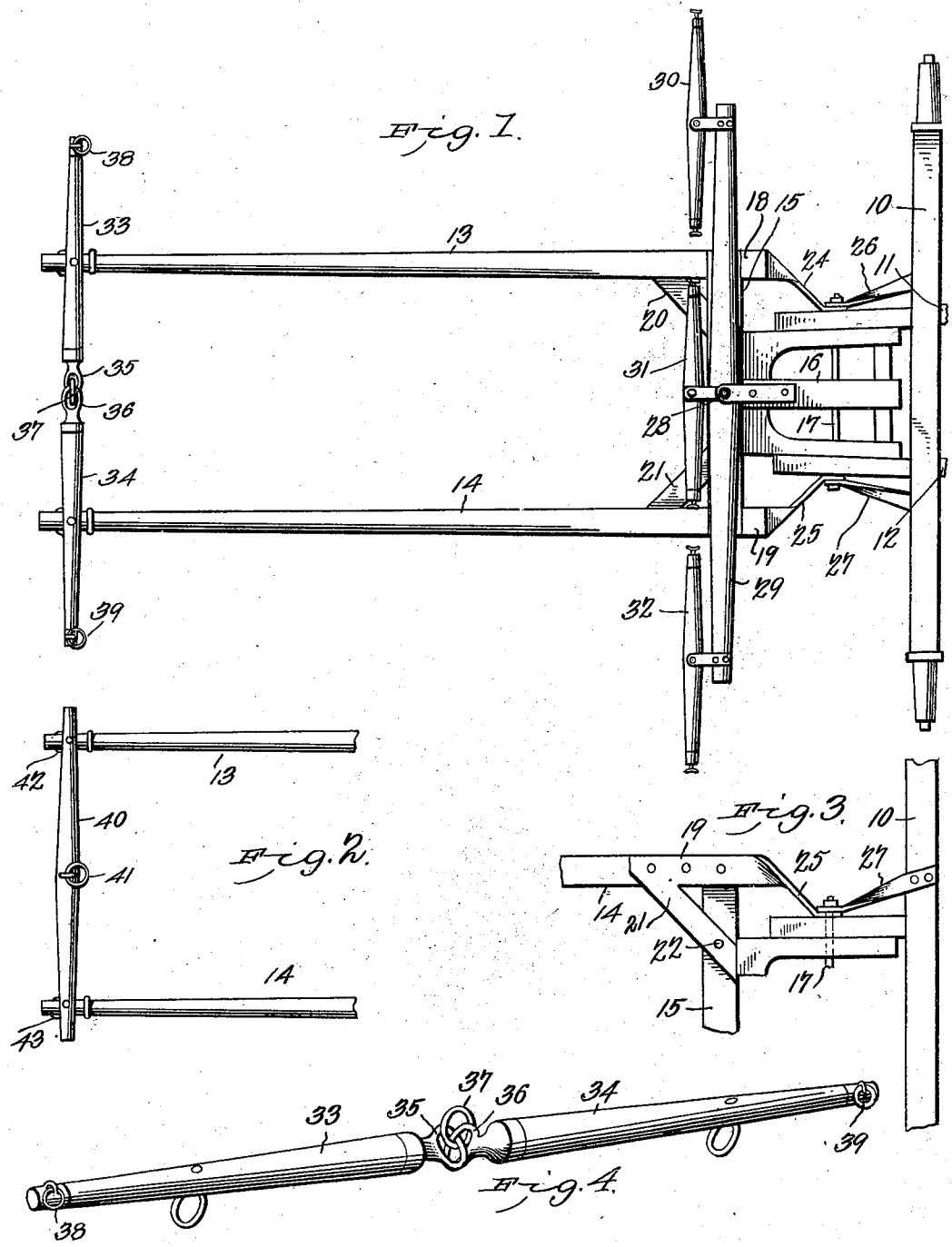
Witnesses
C.J.Bolte, Inventor.
by C.A.Snow & Co.
Attorneys No. 727,886. Patented May 12, 1903.

UNITED STATES PATENT OFFICE.

CHARLES J. BOLTE, OF COLUMBUS, WISCONSIN.

DRAFT ATTACHMENT FOR VEHICLES.

SPECIFICATION forming part of Letters Patent No. 727,886, dated May 12, 1903.

Application filed February 9, 1903. Serial No. 142,649. (No model.)

*To all whom it may concern:*

Be it known that I, CHARLES J. BOLTE, a citizen of the United States, residing at Columbus, in the county of Columbia and State of Wisconsin, have invented a new and useful Attachment for Vehicles, of which the following is a specification.

This invention relates to the draft portions of vehicles, and has for its object to provide means whereby one, two, or three horses may be connected to the vehicle without change in the structure thereof; and the invention consists in certain novel features of construction whereby these results may be attained.

In the drawings illustrative of the invention, in which corresponding parts are designated by like denoting characters, Figure 1 is a plan view of the device applied to the forward running-gear of a vehicle. Fig. 2 is a view of the forward ends of the spaced tongues, illustrating them arranged as thills for one horse. Fig. 3 is a reversed plan view of a portion of the rear portion of the device, illustrating the manner of constructing and applying the brace means between the parts. Fig. 4 is an enlarged perspective view of the coupled neck-yokes detached.

The improved device may be attached to any of the ordinary forms of farm or lumber wagons, and for the purpose of illustration it is shown attached to an ordinary structure of this class, 10 representing the forward axle, and 11 12 the reversely-inclined axle-hound members of the usual construction.

The improved attachment consists of spaced tongues 13 14, connected at their rear ends by a transverse bar 15, the latter connected in turn to a "tongue-hound" structure 16, extending between the axle-hound members 11 12, to which it is pivotally connected by the usual pivot-rod 17, as shown. By this simple means the spaced tongues are movably connected to the axle-hounds and free to swing vertically relative thereto.

Attached to the under sides of the rear ends of the tongues are brace-plates 18 19, having portions 20 21 extending to the bar 15 and connected thereto by bolts, as 22, while portions 24 25 extend rearwardly and are pivoted upon the outer ends of the bolt 17, as shown more clearly in Fig. 3. By this simple means the tongue members are firmly braced and united and likewise firmly braced from the axle-hounds, while at the same time the tongue members are free to swing upon the bolt. The tongue members are thus supported with sufficient rigidity to prevent lateral movement or displacement, while at the same time free to move vertically, as required. As a further means of support the axle-hounds are connected to the axle by diagonal braces 26 27, and the outer or forward ends of the braces are connected to the bolt 17 outside the brace extensions 24 25. The tongue-hounds are thus braced and supported laterally and a very firm and substantial joint formed, which while firmly resisting lateral movement will at the same time permit the requisite vertical movement to the tongues.

Pivotally connected to the bar 15 by the usual pin 28 is a "tripletree" 29, having the singletrees 30 31 32 when three horses are employed. When one horse only is employed, the tongues 13 14 will serve as thills and a singletree will be substituted for the tripletree.

If two horses are to be employed, the double tongue will be disconnected and an ordinary single tongue and doubletree, with its attached singletrees, substituted.

The device is thus adapted for three horses, two horses, or a single horse at very little trouble and without changing the structure of the vehicle.

The outer ends of the tongue members 13 14 will be provided with the usual means for the attachment of the neck-yokes, and when three horses are employed two double neck-yokes 33 34 will be employed, with their adjacent ends provided with interengaging eyes or links 35 36 and with a third loop or link 37 loosely coupled thereto, as shown. The neck-yokes are thus loosely coupled and the necessary flexibility provided for, while at the same time provision made by means of the loose link 37 for the connection of the hames or collar of the center horse.

The outer ends of the yokes 33 34 will be provided with the usual rings or links (indicated at 38 39) for the attachment of the hame or collar coupling means of the outside horses. By this simple means the outer ends of the tongues are coupled and lateral displacement prevented, while at the same time the requisite flexibility of movement is permitted.

When the device is employed for a single horse, the double yokes 33 34 will be detached and a single yoke member 40 substituted, with a central loop 41 for the connection of the hames and end links 42 43 for attachment to the tongues. By this means the device is very easily and quickly changed and adapted for one, two, or three horses and equally convenient for either and without producing a cumbersome or unsightly device.

The tongue members and other parts may be of any desired size and form to adapt them to the vehicle upon which they are employed and will be of ample strength to resist the strains to which they will be subjected.

Having thus described my invention, what I claim is—

In an attachment for vehicles, the combination of the axle-hounds, spaced tongues united at their rear ends to a transverse bar, tongue-hounds extending rearwardly from said bar and between said axle-hound members, a pivot-bolt connecting said tongue-hounds and axle-hounds, and brace-plates connected to said tongues and provided with extensions united to said transverse bar and with extensions movably connected to the pivot-rod of said hounds, substantially as described.

In testimony that I claim the foregoing as my own I have hereto affixed my signature in the presence of two witnesses.

CHARLES J. BOLTE.

Witnesses:
E. E. BROSSARD,
FRANK E. BELL.